(No Model.)

M. BRENDEL.
RESILIENT TIRE.

No. 603,036.  Patented Apr. 26, 1898.

Witnesses
Peter Albertine Jr.
Fred Bugasch

M. Brendel Inventor
By his Attorney
Oscar F. Gunz

UNITED STATES PATENT OFFICE.

MICHAEL BRENDEL, OF NEW YORK, N. Y.

RESILIENT TIRE.

SPECIFICATION forming part of Letters Patent No. 603,036, dated April 26, 1898.

Application filed August 10, 1897. Serial No. 647,667. (No model.)

*To all whom it may concern:*

Be it known that I, MICHAEL BRENDEL, a citizen of the United States, and a resident of the city of New York, in the county and State of New York, have invented certain new and useful Improvements in Resilient Tires, of which the following is a specification.

This invention relates to improvements in elastic tires for vehicle-wheels of that class of tires that are hollow and contain a spring for the purpose of obtaining the desired resiliency in contradistinction to pneumatic or solid rubber tires.

Tires have been used heretofore which consisted of a circular rubber tube surrounding or enveloping a helical spring; but such springs invariably cut the rubber tube, as the spring when subjected to pressure during use was compressed radially and at the same time expanded laterally with the tire and its several convolutions worked and shifted on the inner surface of the tube and in a short time cut through the same.

The object of my invention is to provide a new and improved tire which is very resilient, strong, light, and durable.

Figure 1:
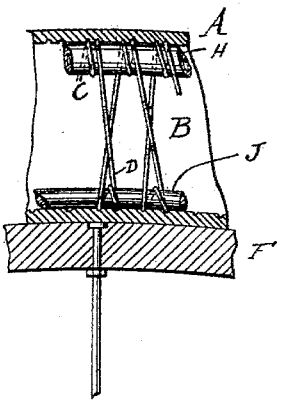
Figure 2:
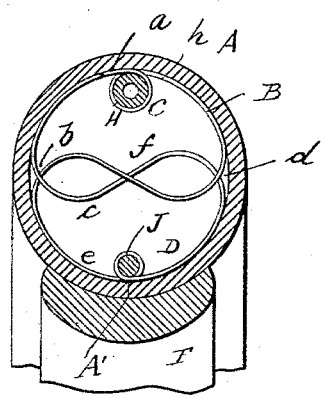
Figure 3:
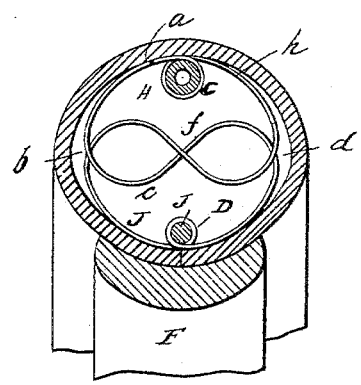

In the accompanying drawings, forming a part of this specification and in which like letters of reference indicate like parts in all the views, Figure 1 is a vertical longitudinal sectional view of a part of my improved elastic tire. Figs. 2 and 3 are enlarged detail vertical transverse sectional views through the tire and wheel-rim, showing the parts of the tire in different positions.

The tire A, made of rubber or leather, is provided with a seam A', which may be closed by lacing or otherwise.

The tire contains a spring-wire B, wound to form a circular helix which extends throughout the entire tire. The several turns or convolutions of the helix do not each consist of a plain circle, but are formed in special manner, so that the pressure exerted radially on the helix is taken up in such a manner that the convolutions or turns do not expand laterally under such pressure. Each turn or convolution of the helix is so shaped that the wire forming the helix extends across the convolution or turn two or more times on curved lines. For example, the form shown in the drawings is as follows, omitting the outer and inner loops C and D, which will be discussed later: Beginning at $a$ the wire extends down on the left on a curved line to about the point $b$, then across the circle on an S-line $c$ to about the point $d$, then describes approximately a half-circle $e$ to near the point $b$, then across the circle again on an S-line $f$ to about the point $d$, and then up the point of beginning $a$ to complete the half-circle $h$. If such a spring is subjected to pressure on a line radial to the wheel and across the crossed wires, the upper and lower approximately half-circles retain their shapes, but the crossed wires $c$ and $f$ are bent to a greater degree, as shown in Fig. 3. The cross-wires $c$ and $f$ need not necessarily have the shape shown, as any other similar curved shape will answer as well. The top and bottom half-circles must always retain their shape and only move toward and from each other accordingly as pressure is applied or removed. It is evident that a spring of this kind cannot expand laterally, as appears from Fig. 3. The wire is also bent to form a small loop or eye C at the outer circumference and within the circle, and a like loop or eye D is within the circle at the inner circumference. A wire H is passed through the loops D, and a rubber tube J, corrugated on the outside and fitting within the loop C, is passed through them, the loops fitting within the annular grooves.

The tire A is preferably grooved circumferentially on the inside for the purpose of holding the convolutions of the wire spring in place.

The circumferential grooves in the tube J and the wire H serve for the same purpose.

The helical spring may be made of light or heavy wire, as the circumstances may require, and the several convolutions may be made greater or less distances apart, as the desired resiliency of the tire may require.

F represents the wheel-rim.

Having thus described my invention, what I desire to secure by Letters Patent is—

1. A tubular spring for resilient tires, formed of spring-wire bent to have circular turns and the wire crossing each circular turn twice, on curved lines, substantially as herein shown and described.

2. A tubular spring for resilient tires, formed of spring-wire bent to form a series of continuous circular turns, the wire extending transversely across each turn on curved lines, which curved lines cross each other within the circle, substantially as herein shown and described.

3. A tubular spring for resilient tires formed of a spring-wire bent to form a series of continuous circular turns, and forming two diametrically opposite loops within each circle and the wire of the circle extending across the same on curved lines between said loops, substantially as herein shown and described.

4. A tubular spring for resilient tires formed of a spring-wire bent to form a series of continuous circular turns the wire for each circular turn being bent to form a half-circle, then extending on a curved line across the open part of said half-circle, then forming the opposite half-circle and extending on a curved line across the open part of said second half-circle and so on, substantially as herein shown and described.

5. The combination with a tubular wire spring having continuous circular turns each circle having two opposite interior loops and the wire of the circle crossing the same on curved lines between said loops, a rod passed through one set of loops and a rubber tube through the other set and a tubular rubber tire enveloping said tubular spring, substantially as herein shown and described.

6. The combination with a helical spring having two diametrically opposite loops in each circular turn and the wires of the circular turn extending across the circle on curved lines between said loops, a wire passed through one set of loops, an externally circumferentially-corrugated rubber tube passed through the outer set of loops and a rubber tire surrounding the helical spring, substantially as herein shown and described.

In testimony that I claim the foregoing as my invention I have signed my name, in presence of two witnesses, this 30th day of July, 1897.

MICHAEL BRENDEL.

Witnesses:
OSCAR F. GUNZ,
FREDERICK BUGASCH.